United States Patent
Hilty et al.

(10) Patent No.: US 10,337,595 B2
(45) Date of Patent: Jul. 2, 2019

(54) EXTRUDED PROTRUSION LASER WELDED SEAL PLATE

(71) Applicant: Schaeffler Technologies AG & Co. KG, Herzogenaurach (DE)

(72) Inventors: Drew Hilty, Wooster, OH (US); Justin Persinger, Norton, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 273 days.

(21) Appl. No.: 15/297,472

(22) Filed: Oct. 19, 2016

(65) Prior Publication Data

US 2018/0106350 A1    Apr. 19, 2018

(51) Int. Cl.
*F16H 41/28* (2006.01)
*F16H 41/24* (2006.01)
*F16H 45/02* (2006.01)
*F16D 13/40* (2006.01)

(52) U.S. Cl.
CPC .............. *F16H 41/28* (2013.01); *F16H 41/24* (2013.01); *F16H 45/02* (2013.01); *F16D 13/40* (2013.01); *F16H 2045/021* (2013.01); *F16H 2045/0215* (2013.01); *F16H 2045/0247* (2013.01); *F16H 2045/0294* (2013.01)

(58) Field of Classification Search
CPC .... F16H 41/28; F16H 45/02; F16H 2045/021; F16D 13/40; B23K 33/002; B23K 2101/06; B23K 2101/10; B23K 9/0288
See application file for complete search history.

(56) References Cited

U.S. PATENT DOCUMENTS

| 2,245,298 A * | 6/1941 | Proctor ................ B23K 11/002 219/107 |
| 6,431,335 B1 * | 8/2002 | Kundermann .......... F16H 45/02 192/3.3 |
| 2006/0021220 A1 * | 2/2006 | Sato ........................ F16H 41/28 29/889.21 |
| 2007/0007095 A1 * | 1/2007 | Tsukamoto ......... F16D 25/0638 192/3.29 |
| 2013/0056319 A1 * | 3/2013 | Lindemann ............. F16H 45/02 192/3.29 |
| 2016/0131236 A1 | 5/2016 | Gurney |
| 2018/0010675 A1 * | 1/2018 | Park .................. F16F 15/12366 |

* cited by examiner

*Primary Examiner* — Stacey A Fluhart

(57) ABSTRACT

A torque converter, including: an axis of rotation; a cover arranged to receive torque; an impeller including an impeller shell non-rotatably connected to the cover and at least one impeller blade fixed to the impeller shell; a turbine including a turbine shell and at least one turbine blade fixed to the turbine shell; a hub; a seal plate; and a weld fixedly connecting the hub and the seal plate. A line orthogonal to the axis of rotation passes through, in sequence, the hub, the weld, the seal plate, and the hub.

14 Claims, 5 Drawing Sheets

EXTRUDED PROTRUSION LASER WELDED SEAL PLATE

TECHNICAL FIELD

The present disclosure relates to a four-pass torque converter with a seal plate having an extruded protrusion to provide a large, robust weld.

BACKGROUND

FIG. 5 is a partial cross-section view of prior art four-pass torque converter 200. Torque converter 200 includes cover 202 arranged to receive torque, impeller 204 with impeller shell 206, turbine 208 with turbine shell 210, hub 212, and lock-up clutch 214 with piston plate 216. Torque converter 200 includes pressure chambers 218 and 220. Chamber 218 is bounded by hub 212, piston plate 216, and seal plate 222. Chamber 220 is bounded by cover 202, hub 212, and piston plate 216. To close clutch 214 (non-rotatably connect cover 202 and piston plate 216), fluid pressure in chamber 218 is increased and fluid pressure in chamber 220 is decreased to displace piston plate 216 in axial direction AD1. To open clutch 214, fluid pressure in chamber 220 is increased and fluid pressure in chamber 218 is decreased to displace piston plate 216 in axial direction AD2.

End E of seal plate 222 is butt-welded to hub 212 with weld 224. Root 226 for weld 224 is an area of weld 224 most susceptible to failure in response to pressure applied to seal plate 222 during the close mode for clutch 214. For example, simulations have shown that for a fluid pressure of 9.5 bar in chamber 218, the stress (tension) on root 226 is greatly elevated. An axial extent of weld 224 is linked to thickness 228 of plate 222. For example, weld 224 extends no further than seal plate 222 in direction AD1.

SUMMARY

According to aspects illustrated herein, there is provided a torque converter, including: an axis of rotation; a cover arranged to receive torque; an impeller including an impeller shell non-rotatably connected to the cover and at least one impeller blade fixed to the impeller shell; a turbine including a turbine shell and at least one turbine blade fixed to the turbine shell; a hub; a seal plate; and a weld fixedly connecting the hub and the seal plate. A line orthogonal to the axis of rotation passes through, in sequence, the hub, the weld, the seal plate, and the hub.

According to aspects illustrated herein, there is provided a torque converter, including: an axis of rotation; a cover arranged to receive torque; an impeller including an impeller shell non-rotatably connected to the cover; a turbine including a turbine shell; a seal plate with a first surface; a hub including a first surface; a weld disposed between the first surface of the hub and the first surface of the seal plate and fixedly connected to the first surface of the hub and the first surface of the seal plate; and a first pressure chamber bounded, at least in part, by the hub and the seal plate. A line orthogonal to the axis of rotation passes through, in sequence, the hub, the weld, the seal plate, and the hub.

According to aspects illustrated herein, there is provided a torque converter, including: an axis of rotation; a cover arranged to receive torque; an impeller including an impeller shell non-rotatably connected to the cover and at least one impeller blade fixed to the impeller shell; a turbine including a turbine shell and at least one turbine blade fixed to the turbine shell; a hub; a seal plate including a radially innermost surface and a protrusion, including at least a portion of the radially innermost surface of the seal plate and extending in a first axial direction; and a weld fixedly connecting the hub and the seal plate and extending past the protrusion in the first axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
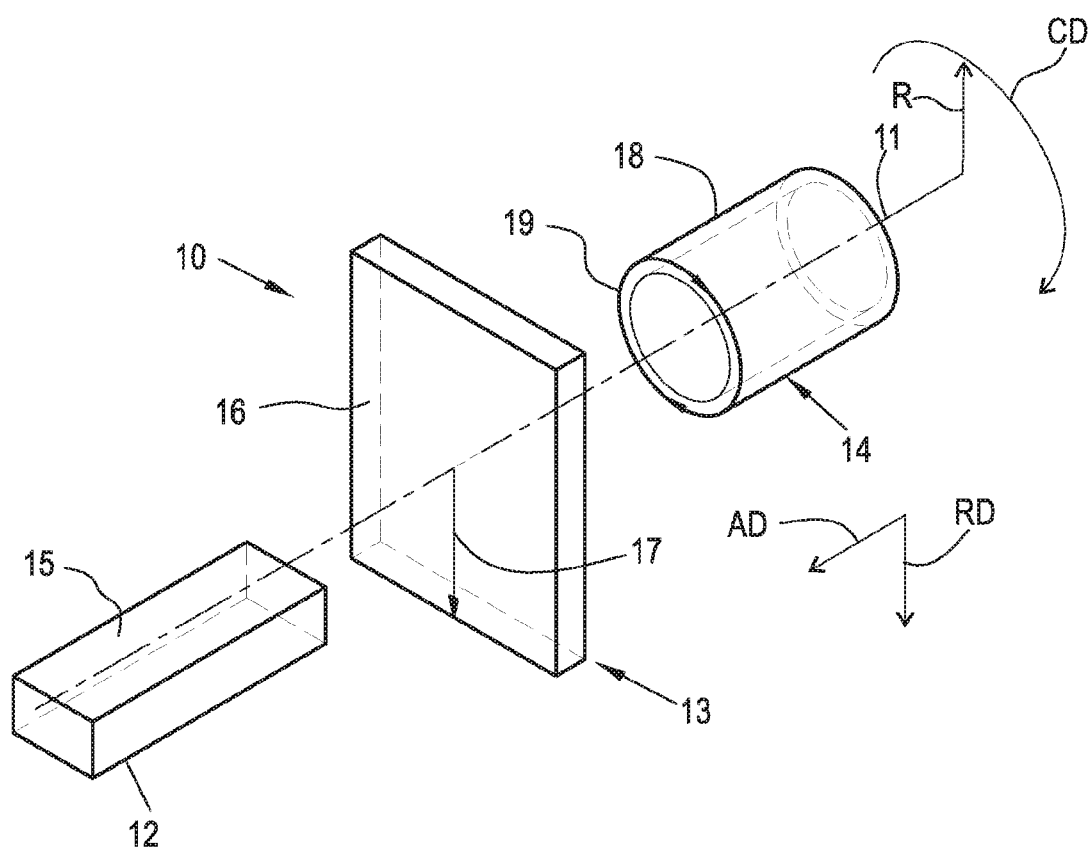
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
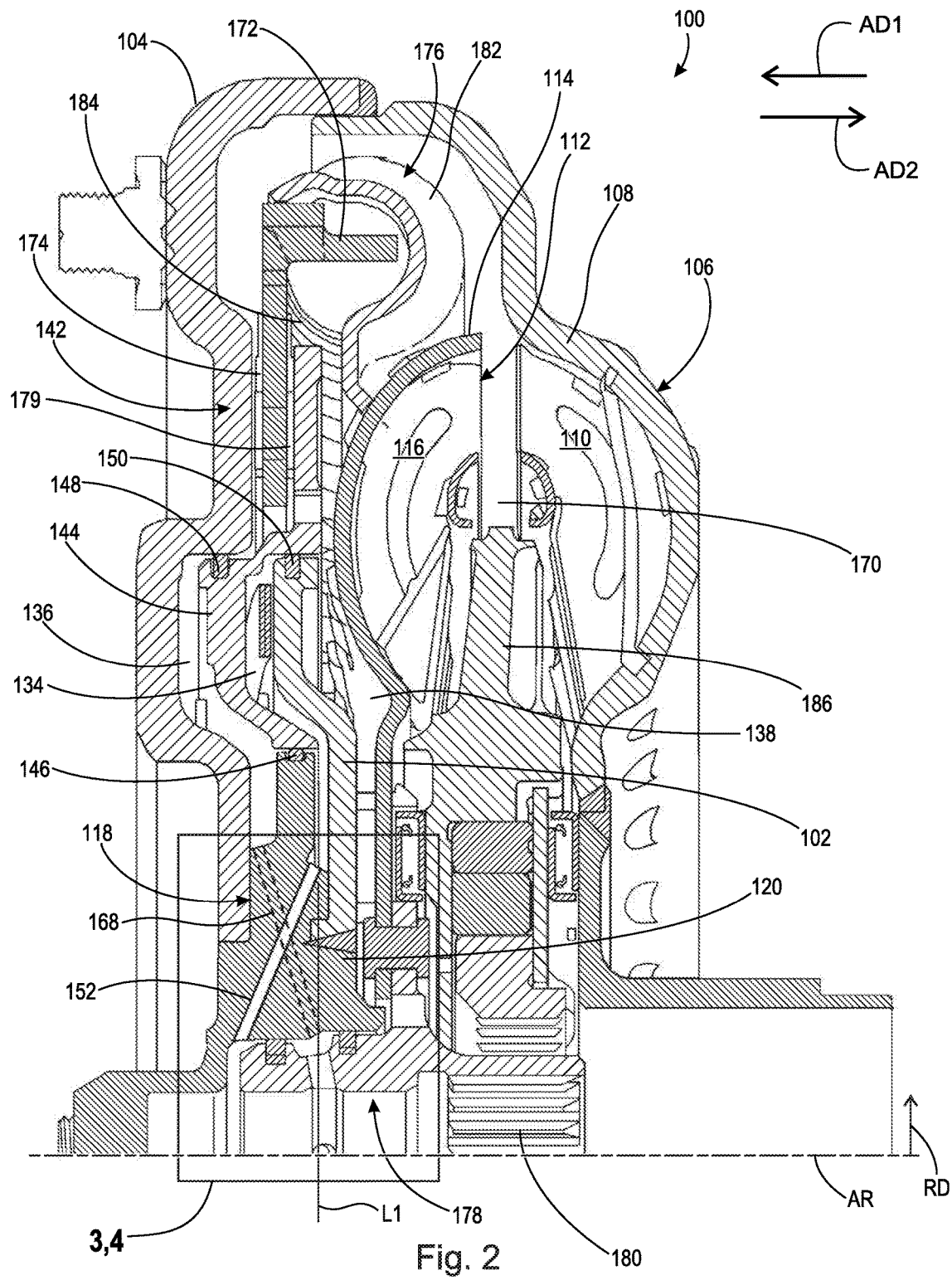
FIG. 2 is a partial cross-sectional view of a four-pass torque converter with an extruded protrusion welded seal plate.

FIG. 2 is a partial cross-sectional view of four-pass torque converter 100 with extruded protrusion welded seal plate 102.

Figure 3:
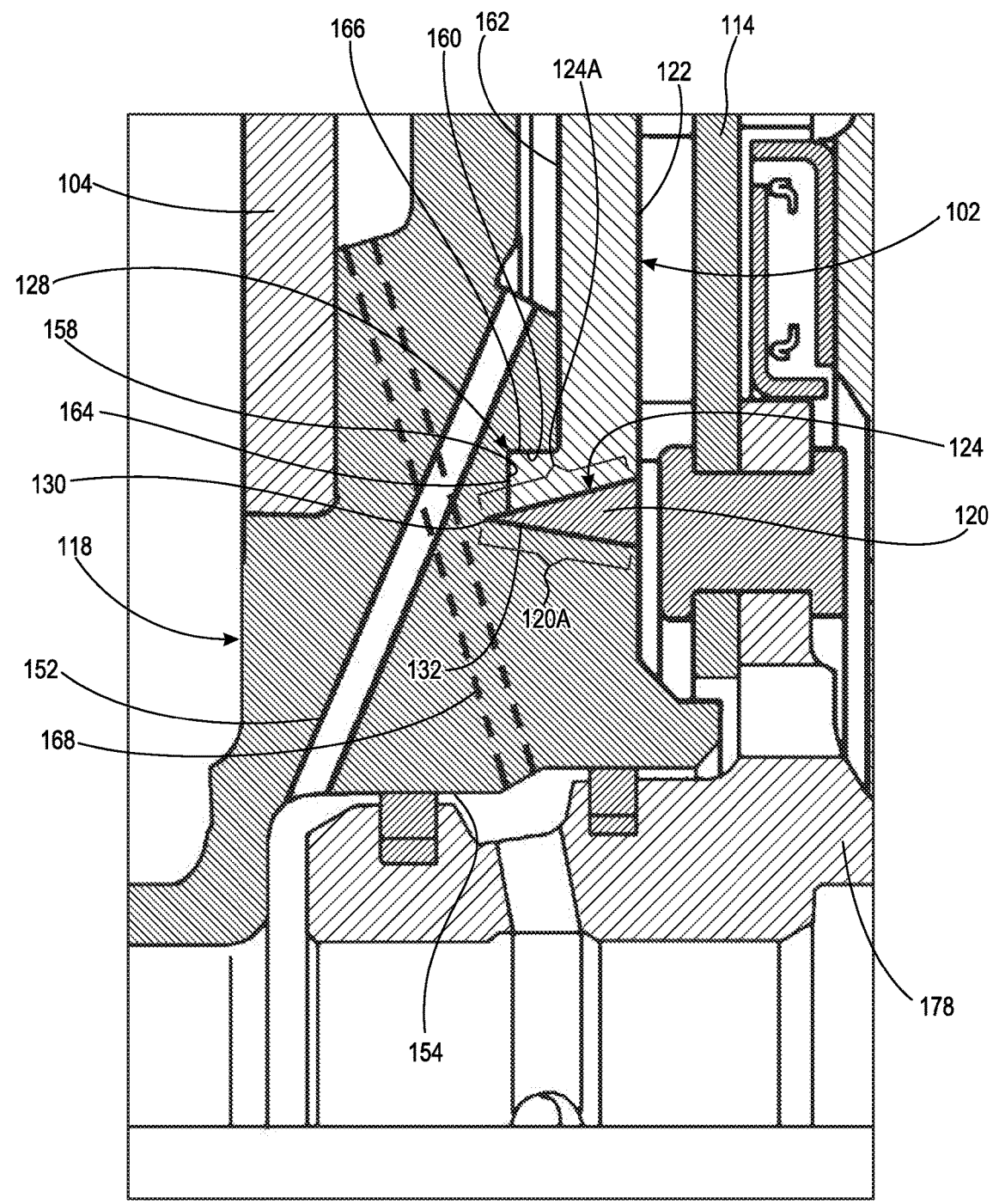
FIG. 3 is a detail of area 3/4 in FIG. 2.

FIG. 3 is a detail of area 3/4 in FIG. 2.

Figure 4:
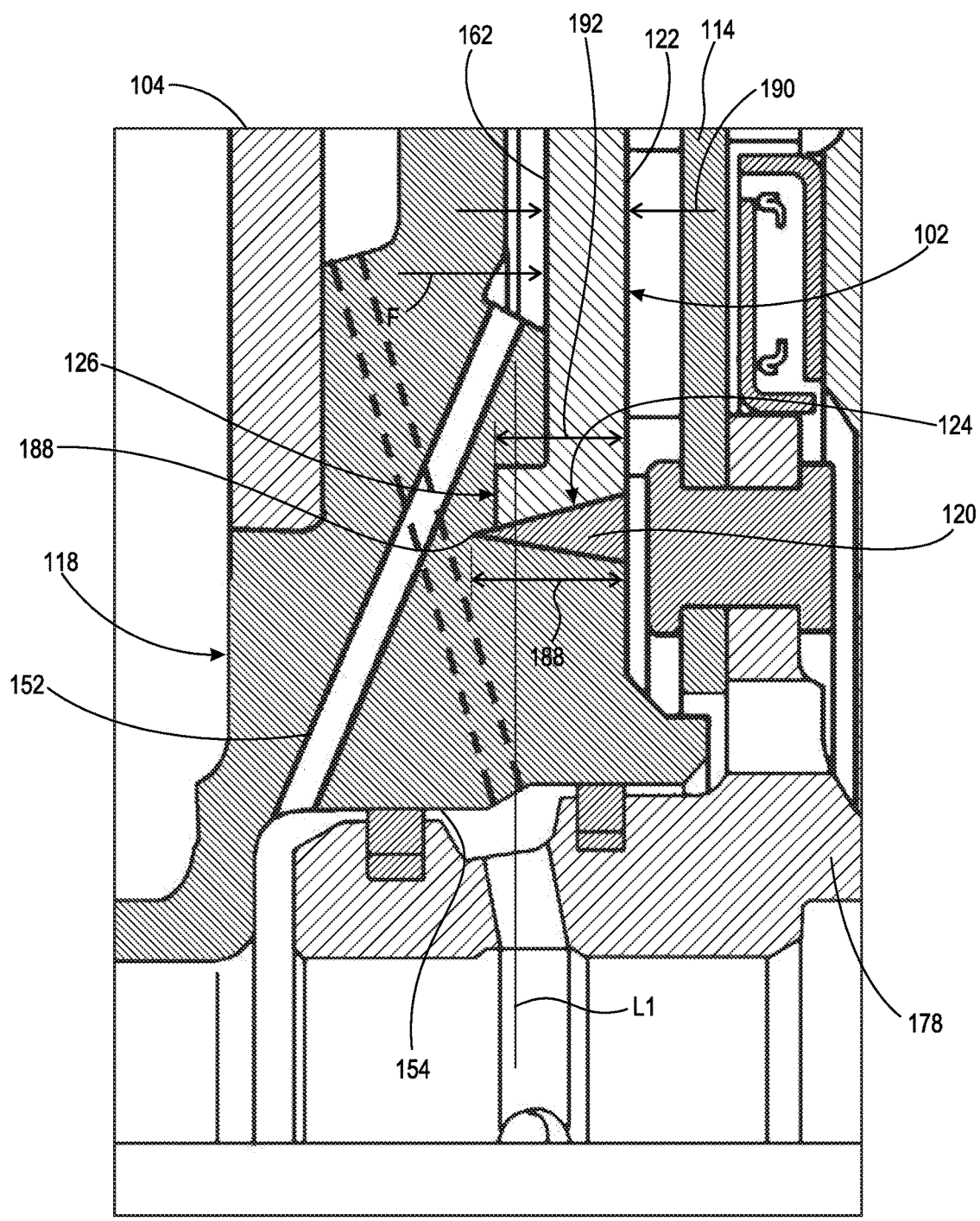
FIG. 4 is a detail of area 3/4 in FIG. 2.
Figure 5:
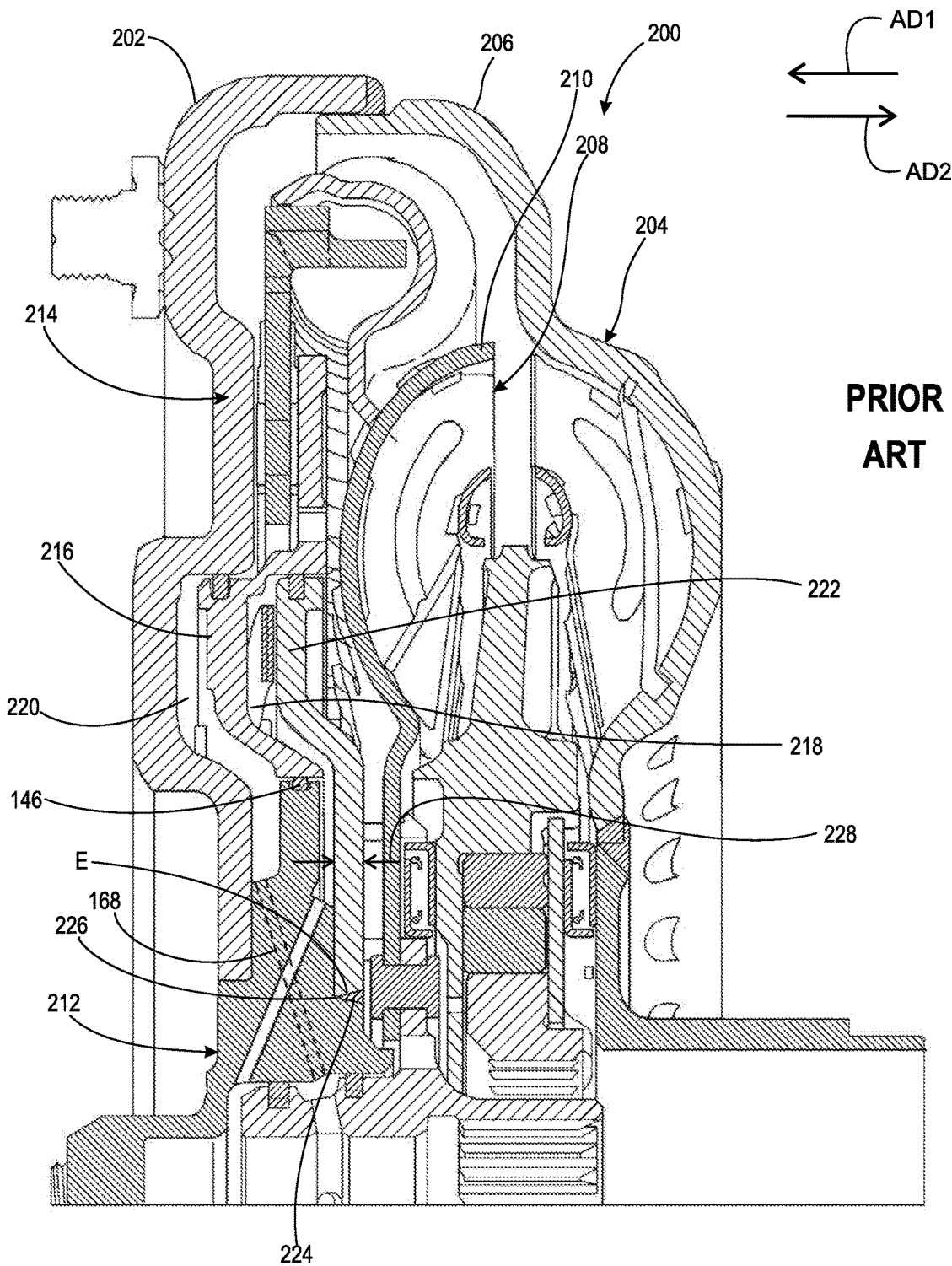
FIG. 5 is a partial cross-section view of a prior art four-pass torque converter.

FIG. 4 is a detail of area 3/4 in FIG. 2. The following should be viewed in light of FIGS. 2 through 4. Torque converter 100 includes: axis of rotation AR; seal plate 102; cover 104 arranged to receive torque; impeller 106 including impeller shell 108 non-rotatably connected to cover 104, and at least one impeller blade 110 fixed to impeller shell 108; turbine 112 including turbine shell 114 and at least one turbine blade 116 fixed to turbine shell 114; hub 118; and weld 120 fixedly connecting hub 118 to seal plate 102. Weld 120 is formed by melting respective portions of plate 102 and hub 118, for example by a laser welder. Line L1, orthogonal to axis of rotation AR, passes through, in sequence, hub 118, weld 120, seal plate 102, and hub 118.

Seal plate 102 includes: surface 122 extending in radial direction RD orthogonal to the axis of rotation; radially innermost surface 124 extending from surface 122 in axial direction AD1 away from turbine shell 114; and protrusion 126 extending in axial direction AD1 and including radially innermost surface 124. Note that surface 124 also extends radially inward. Line L1 passes through in sequence, hub 118, weld 120, protrusion 126, surface 124, and hub 118.

Hub 118 includes indentation 128 extending into hub 118 in axial direction AD1. Protrusion 126 is located in indentation 128 and includes portion 124A of surface 124. Portion 120A of weld 120 is located in indentation 128. In an example embodiment, root 130, forming the portion of weld 120 furthest in direction AD1, extends past protrusion 126 in direction AD1. Hub 118 includes surface 132. Surface 132 forms a portion of indentation 128. Weld 120 is in contact with and radially disposed between surfaces 124 and 132. Line L1 passes through, in sequence, surface 132, weld 120, and surface 124.

Torque converter 100 includes pressure chambers 134, 136 and 138. Chamber 134 is bounded, at least in part, by plate 102 and hub 118. In an example embodiment: chamber 136 is bounded, at least in part, by cover 104 and hub 118; and chamber 138 is bounded, at least in part, by seal plate 102 and turbine shell 114.

Torque converter 100 includes lock-up clutch 142 including axially displaceable piston plate 144. Chambers 134 and 136 are bounded at least in part by piston plate 144. Piston plate 144 is displaceable, in response to pressure in pressure chamber 134 (increasing fluid pressure in chamber 134), in axial direction AD1 to close clutch 142 and non-rotatably connect piston plate 144 to cover 104. Piston plate 144 is displaceable, in response to pressure in pressure chamber 136 (increasing fluid pressure in chamber 136), in axial direction AD2, opposite axial direction AD1, to open clutch 142 so that piston plate 144 is rotatable with respect to cover 102. By "non-rotatably connected" elements we mean that: whenever one of the elements rotates at a particular speed, all of the elements rotate at that particular speed; and relative rotation between the elements is not possible. Axial or radial displacement of the elements with respect to each other is possible.

Torque converter 100 includes: seal 146 sealed against hub 118 and piston plate 144; seal 148 sealed against piston plate 144 and cover 102; and seal 150 sealed against seal plate 102 and piston plate 144. In an example embodiment, hub 118 includes at least one channel 152 extending from radially innermost surface 154 of hub 118 to chamber 134. Chamber 134 is sealed from the remainder of torque converter 100, for example from chambers 136 and 138 with the exception of channel(s) 152. That is, the only path for fluid to enter or exit chamber 134 is through channel(s) 152. For example, seal 146 and 148 seal chamber 134 from chamber 136 and seal 150 seals chamber 134 from chamber 138.

Seal plate 102 includes surfaces 158 and 160. Surface 158 extends radially outward from surface 124. Surface 160 extends from surface 158 in axial direction AD2 toward the turbine shell. In an example embodiment, one or both of surfaces 158 and 160 are in contact with hub 118. Seal plate 102 includes surface 162 extending radially outward from surface 160. Chamber 134 is bounded, at least in part, by surface 162. In an example embodiment, at least a portion of surface 162 is in contact with hub 118. Thus, protrusion 126 is in the shape of a backward "L" extending from surfaces 122 and 162. That is, protrusion 128 is formed by portion 124A of surface 124, surface 158, and surface 160. Chamber 138 is bounded in part by surface 122.

Hub 118 includes surfaces 164 and 166. Surface 164 extends radially outward from surface 132. Surface 166 extends from surface 164 in direction AD2. Indentation 128 is formed by surfaces 132, 164, and 166 of hub 118. Surfaces 132 and 166 are separated from each other in radial direction RD. Surface 164 directly connects surfaces 132 and 166. In an example embodiment, surface 164 is in contact with surface 158, or surface 166 is in contact with surface 160. In an example embodiment, surface 164 is in contact with surface 158, and surface 166 is in contact with surface 160.

In an example embodiment, hub 118 includes at least one channel 168 extending from radially inner surface 154 of hub 118 to chamber 136. Chamber 136 is sealed from the remainder of torque converter 100, for example from chambers 134 and 138 with the exception of channel(s) 168. That is, the only path for fluid to enter or exit chamber 136 is through channel(s) 168. For example, seal 146 seals chamber 136 from chamber 134 and seal 148 seals chamber 136 from chamber 138. Torque converter 100 includes space, or torus, 170 formed by shells 108 and 114. Chamber 138 includes space 170.

In an example embodiment, clutch 142 includes drive plate 172 and friction material 174 axially located between cover 104 and piston plate 144. In an example embodiment, torque converter 100 includes torsional vibration damper 176 and output hub 178. Hub 178 is non-rotatably connected to turbine shell 114 and is arranged to non-rotatably connect to an input shaft (not shown) for a transmission, for example, via spline teeth 180. Damper 176 includes spring retainer plate 182 and at least one spring 184. Plate 182 is non-rotatably connected to turbine shell 114 and at least one spring 184 is engaged with drive plate 172 and plate 182.

Torque converter 100 operates as follows. For a torque converter mode, clutch 142 is open so that piston plate 144 is rotatable with respect to cover 102 and torque from cover 102 is transmitted to impeller shell 108. A hydraulic connection of impeller 106 and turbine 112 through stator 186 transmits torque from shell 112 to output hub 178 through shell 114. To open clutch 142, fluid pressure in chamber 136 is increased to be greater than fluid pressure in chamber 134. Pressure in chamber 134 may be decreased to facilitate this differential.

For a lock-up mode for torque converter 100, clutch 142 is closed so that drive plate 172 and piston plate 144 are non-rotatably connected to cover 104. Torque from cover 104 is transmitted to output hub 178 through drive plate 172, spring(s) 184, plate 182, and shell 114. To close clutch 142, fluid pressure in chamber 134 is increased to be greater than fluid pressure in chamber 136. Pressure in chamber 136 may be decreased to facilitate this differential.

Advantageously, seal plate 102, hub 118, and weld 120 address the problem of excess tension on the root of a weld connecting a sealing plate, for example for a four-pass torque converter, to a hub for the four-pass torque converter. For example, fluid pressure in chamber 134 exerts force F on seal plate 102 in direction AD2. However, significant portions of force F are diverted from root 130 of weld 120 and are instead shifted to protrusion 126. For example, the bending stress between protrusion 126 and the remainder of plate 102 absorbs portions of force F. As a result, the tension on root 130 of weld 120 and on weld 120 in general is reduced. For example, simulations have shown that for a fluid pressure of 9.5 bar in chamber 134, the stress (tension) on root 130 is less by a factor of about 2.5 than the stress described above on root 226. Reducing the stress on root 130 increases the durability of weld 120, increasing the service life of torque converter 100.

Further, axial extent 188 of weld 120 is not linked to thickness 190 of plate 102, but rather to axial extent 192 of protrusion 126. Extent 192 is greater than thickness 190, therefore, weld 120 is axially longer and stronger than weld 224 described above. Also, the axial deflection of seal plate 102 in the lock-up mode is reduced, advantageously improving volume change for chamber 134 and controllability of clutch 142.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A torque converter, comprising:
an axis of rotation;
a cover arranged to receive torque;
an impeller including:
an impeller shell non-rotatably connected to the cover; and,
at least one impeller blade fixed to the impeller shell;
a turbine including a turbine shell and at least one turbine blade fixed to the turbine shell;
a hub;
a seal plate including a first surface in contact with the hub; and,
a weld fixedly connecting the hub and the seal plate, wherein a line orthogonal to the axis of rotation passes through, in sequence, the hub, the weld, the seal plate, the first surface of the seal plate, and the hub.

2. The torque converter of claim 1, wherein:
the seal plate includes:
a second surface extending in a radial direction orthogonal to the axis of rotation;
a radially innermost surface extending from the second surface in a first axial direction away from the turbine shell; and,
a protrusion extending in the first axial direction, the protrusion including the radially innermost surface; and,
the line passes through in sequence, the hub, the weld, the protrusion, and the hub.

3. The torque converter of claim 1, wherein:
the hub includes an indentation extending into the hub in an axial direction away from the turbine shell;
the seal plate includes a protrusion, the protrusion:
located in the indentation; and,
including at least a portion of a radially innermost surface of the seal plate; and,
a portion of the weld is located in the protrusion.

4. A torque converter, comprising:
an axis of rotation;
a cover arranged to receive torque;
an impeller including an impeller shell non-rotatably connected to the cover;
a turbine including a turbine shell;
a seal plate with a first surface;
a hub including a first surface;
a weld disposed between the first surface of the hub and the first surface of the seal plate and fixedly connected to the first surface of the hub and the first surface of the seal plate; and,
a first pressure chamber bounded, at least in part, by the hub and the seal plate, wherein:
a line orthogonal to the axis of rotation passes through, in sequence, the hub, the weld, the seal plate, and the hub without passing through a gap between the seal plate and the hub.

5. The torque converter of claim 4, wherein the line passes through, in sequence, the hub, the weld, the seal plate, the hub, and the first chamber.

6. The torque converter of claim 4, further comprising:
a second pressure chamber bounded, at least in part, by the seal plate and the turbine shell.

7. The torque converter of claim 6, further comprising:
a third pressure chamber bounded, at least in part by the cover and the hub.

8. The torque converter of claim 4, further comprising:
a lock-up clutch including a piston plate; and
a second pressure chamber bounded at least in part by the cover, the hub, and the piston plate, wherein the piston plate is displaceable:
in a first axial direction, by increasing fluid pressure in the first pressure chamber, to non-rotatably connect to the cover; and,
in a second axial direction opposite the first axial direction, by increasing fluid pressure in the second pressure chamber, to be rotatable with respect to the cover.

9. The torque converter of claim 8, further comprising:
a first seal sealed against the hub and the piston plate;
a second seal sealed against the piston plate and the cover; and,
a third seal sealed against the seal plate and the piston plate.

10. The torque converter of claim 8, further comprising:
a third pressure chamber bounded at least in part by the seal plate and the turbine shell.

11. The torque converter of claim 4, wherein the seal plate includes:
a second surface extending in a radial direction orthogonal to the axis of rotation;

a radially innermost surface extending from the second surface in a first axial direction and including the first surface of the seal plate;
a third surface extending radially outward from the radially innermost surface; and,
a fourth surface extending from the third surface in a second axial direction, opposite the first axial direction.

12. The torque converter of claim 11, wherein:
the seal plate includes a fifth surface extending radially outward from the fourth surface of the seal plate; and,
the first pressure chamber is bounded at least in part by the fifth surface.

13. The torque converter of claim 4, wherein:
the hub includes an indentation formed by the first surface of the hub, a second surface of the hub, and a third surface of the hub;
the first and second surfaces of the hub are separated from each other in a radial direction;
the third surface directly connects the first and second surfaces; and,
the seal plate includes a protrusion located in the indentation, the protrusion including at least a portion of the first surface of the seal plate.

14. The torque converter of claim 4, wherein:
the hub includes:
  a radially innermost surface; and,
  at least one channel extending from the radially innermost surface to the first pressure chamber; and,
the first pressure chamber is sealed from a remainder of the torque converter with the exception of the at least one channel.

* * * * *